United States Patent [19]

Patrick

[11] Patent Number: 6,043,757
[45] Date of Patent: Mar. 28, 2000

[54] DYNAMIC, MULTI-ATTRIBUTE HAZARD PRIORITIZATION SYSTEM FOR AIRCRAFT

[75] Inventor: Nicholas J. M. Patrick, Seattle, Wash.

[73] Assignee: The Boeing Company

[21] Appl. No.: 09/096,543

[22] Filed: Jun. 12, 1998

[51] Int. Cl.[7] .................................................. G08B 23/00
[52] U.S. Cl. .............................. 340/963; 340/945; 701/9; 701/14
[58] Field of Search .................................. 340/945, 963, 340/968, 961, 964, 970, 980; 701/8, 9, 14; 244/1 R

[56] References Cited

U.S. PATENT DOCUMENTS

| | | |
|---|---|---|
| 3,582,949 | 6/1971 | Forst . |
| 3,668,403 | 6/1972 | Meilander . |
| 3,988,730 | 10/1976 | Valker . |
| 4,121,287 | 10/1978 | Leal et al. ................................ 340/970 |
| 4,401,971 | 8/1983 | Saito et al. .............................. 340/692 |
| 4,417,248 | 11/1983 | Mathews . |
| 4,635,030 | 1/1987 | Rauch ..................................... 340/520 |
| 5,029,092 | 7/1991 | Funatsu . |
| 5,241,295 | 8/1993 | Madau .................................... 340/461 |
| 5,339,244 | 8/1994 | Stiles, Jr. et al. ....................... 340/963 |
| 5,522,026 | 5/1996 | Records et al. ......................... 340/945 |
| 5,739,769 | 4/1998 | Vladimir et al. ....................... 340/945 |

OTHER PUBLICATIONS

"Smart Alerting", compiled by Paul Proctor, Aviation Week & Space Technology, Feb. 24, 1997, p. 13.

*Primary Examiner*—Brent Swarthout
*Attorney, Agent, or Firm*—James P. Hamley

[57] ABSTRACT

Signals from warning systems are passed to a hazard prioritization computer. The prioritization computer also receives inputs from the aircraft's air data and inertial reference system. The alert prioritization computer includes three functional modules: (1) hazard detection, identification and monitoring, (2) threat assessment and (3) display and alert prioritization logic. The hazard prioritization computer processes the warning system signals, along with stored data from a hazard database to compute a severity component of threat and a proximity component of threat. These two components are processed to produce an overall threat value for each hazard. This overall threat value is then processed to provide alert and display generation and prioritization for the flight crew and/or the aircraft's auto-flight system.

9 Claims, 6 Drawing Sheets

DYNAMIC, MULTI-ATTRIBUTE HAZARD PRIORITIZATION SYSTEM FOR AIRCRAFT

BACKGROUND OF THE INVENTION

The present invention relates to the aircraft alerting and display system arts and, in particular, to a method and apparatus for realizing a dynamic, multi-attribute aircraft hazard prioritization system.

As used herein, the term "hazard" refers to any element of an aircraft's environment which could possibly constitute a threat to that aircraft, its occupants, or its intended mission; and the term "alert" refers to any indication of that hazard which is presented to the flight crew, whether by visual, aural, or other means.

In modern commercial aircraft, there are many warning systems, each providing the flight crew with information about one or more of the hazards to which the aircraft is exposed. These systems typically include a terrain alerting system (such as the ground proximity warning system), predictive and reactive windshear systems, and a traffic alert and collision avoidance system. Such systems produce alerts which may be presented to the flight crew visually or through audible tones or voices. Since many of the audio and visual displays used to present these alerts can only present one alert at a time, while the hazards which give rise to the alerts can occur simultaneously, it is necessary to prioritize the hazards so that the more important alert is presented.

In previous systems, this has been achieved by using a static prioritization scheme in which the hazards are arranged in order of priority—as determined when the warning or display systems are designed or integrated into the aircraft. The prioritization scheme, which may be implemented through the use of discrete signals between the warning systems or through the use of a prioritization list implemented in one of the warning systems, is then fixed. When two or more alerts are generated simultaneously, the alert for the hazard with the highest priority is presented to the flight crew.

There are two main drawbacks to the prior art method of prioritization. First, because the priorities are predetermined, information from the alerting system, such as the distance in time to the situation which has triggered the alert, cannot be used at the time the alerts are generated. For example, if two warning systems, A and B generate alerts for hazards which are 30 to 60 seconds away and 15 to 45 seconds away respectively, a static prioritization scheme would be designed to give priority to system B, since it typically generates alerts for hazards which are closer. However, this would be inappropriate for the case in which system B happened to generate an alert for a hazard which was 45 seconds away while system A was generating an alert for a hazard which was only 30 seconds away.

The second drawback of the prior art method of prioritization is that each hazard has several relevant features—or attributes—which must be considered during prioritization. These other attributes also have a variable element which cannot be accounted for at the design stage. Among these are:

The potential severity of the hazard (for example, terrain is usually considered to be a more significant threat than traffic, and should therefore be given higher priority), The distance and time to the hazard (closer hazards should be given higher priority), and The time required for the response to the hazard (if a hazard requires a longer response then it should be given higher priority, all other things being equal).

These and other attributes must all be considered in prioritizing hazards, but there is currently no accepted method of, or apparatus for realizing such consideration.

BRIEF SUMMARY OF THE INVENTION

It is an object of this invention, therefore, to provide an apparatus and method for realizing a dynamic, multi-attribute aircraft hazard prioritization system.

Briefly, according to the invention, an aircraft dynamic multi-attribute hazard prioritization system comprises at least two aircraft warning systems, with each system operable to produce a signal having associated therewith at least two hazard attributes. In addition, processing means processes the two hazard attributes for each aircraft warning system through a predetermined prioritization function to assign a threat value to the alert signal from each of the two aircraft warning systems. Finally, an aircraft display and alerting system is responsive to the threat value of the alerts from each of the two aircraft warning systems to predeterminedly activate aircraft displays and alerts.

In one aspect of the invention, each of the two aircraft warning systems produces a time-to-hazard related signal, $\tau$. The system further comprises a hazard database for storing a severity signal, s, for each of the at least two aircraft warning systems. The processing means processes the time-to-hazard related signal $\tau$, and the retrieved severity signal, s, through a threat function $T(\tau, s)$, to determine the threat values, T, for the hazards detected by each of the at least two aircraft warning systems.

In yet a further aspect of the invention, the aircraft display and alerting system includes means for activating aircraft displays and alerts such that the hazard having the higher assigned threat value is given display and alert priority.

A method, in accordance with the invention, is provided in an aircraft hazard alerting system for realizing a dynamic multi-attribute hazard prioritization. The method includes the steps of providing at least two aircraft warning systems, with each system operating to produce a hazard signal having associated therewith at least two hazard attributes. A further step includes processing the at least two hazard attributes for each aircraft warning system through a predetermined threat function to assign a threat value to the signal from each of the at least two aircraft warning systems. A final step includes implementing aircraft displays and alerts in response to the threat values of the hazards detected by each of the at least two aircraft warning systems.

In a further aspect of the above method, an additional step includes providing each of the at least two aircraft warning systems with means for producing a time-to-hazard related signal, $\tau$. A further step includes providing a hazard database for storing a severity signal, s, for each of the at least two aircraft warning systems. A final step includes implementing the processing means to process the time-to-hazard related signal, $\tau$, and retrieved severity signal, s, through a threat function $T(\tau, s,)$ and determining the threat value for the hazard signal from each of the at least two aircraft warning systems.

In a further aspect of the above method, the step of implementing aircraft displays and alerts includes the step of activating aircraft displays and alerts such that the alert having the higher assigned threat value is given display and alert priority.

These and other aspects of the invention will become clear through reading of the detailed description hereinbelow and by reference to the accompanying figures.

DETAILED DESCRIPTION OF THE INVENTION

The inventive dynamic, multi-attribute hazard prioritization system integrates information from several warning systems. It combines attribute values such as time-to-hazard and hazard severity for all detected hazards in a vehicle's environment (1) to provide display de-cluttering and prioritization, (2) to generate various levels of alert, and (3) when there are multiple hazard alerts, to resolve conflicts so as to determine a priority for each alert.

Figure 1:
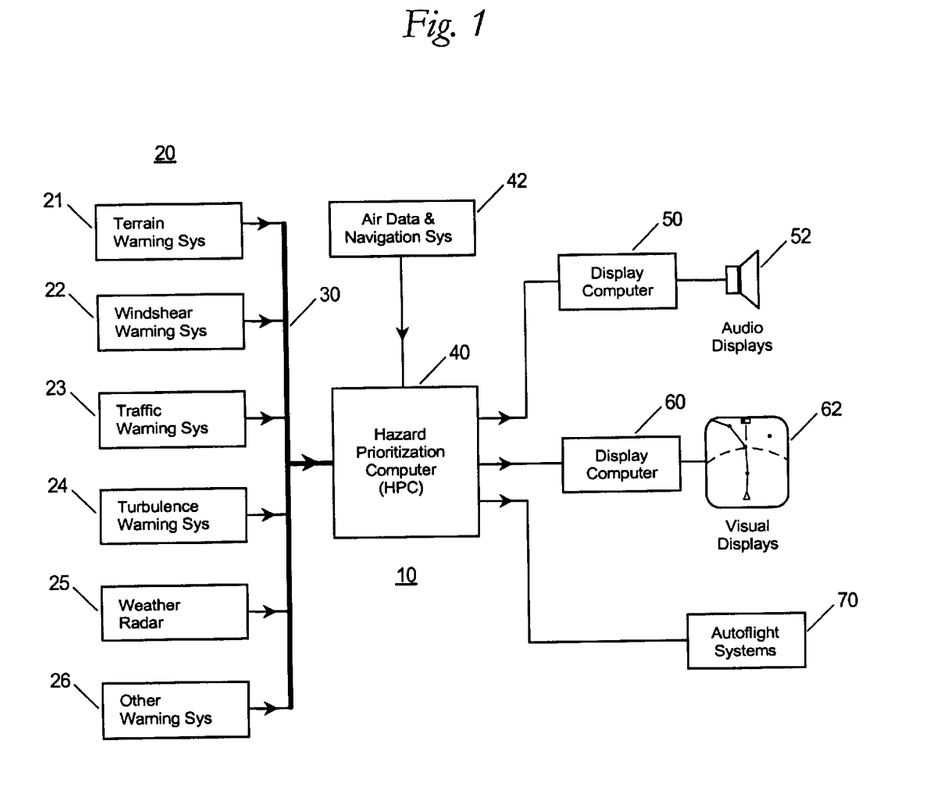
FIG. 1 is a block diagram illustrating the hardware architecture used to implement the preferred embodiment of the dynamic multi-attribute hazard prioritization system.

FIG. 1 is a block diagram illustrating the hardware architecture used to implement the preferred embodiment of the aircraft dynamic hazard prioritization system, here indicated generally at 10. Illustrated generally at 20 are six aircraft warning systems 21–26, each of which detects a threatening condition in the aircraft's environment.

A terrain warning system, 21, detects the presence, range, extent and so forth of terrain.

A windshear warning system 22 detects the presence and severity of environmental windshear conditions.

A traffic warning system 23 detects the presence, range and intent of nearby air traffic.

A turbulence warning system 24 detects the presence and degree of environmental and wake turbulence.

A weather radar 25 detects the presence and severity of environmental weather conditions.

A number of other warning systems are provided on modern commercial aircraft, which are collectively referenced at block 26.

The attributes of the hazards monitored by the various warning systems 21–26 are passed over a databus 30 to a hazard prioritization computer (HPC) 40. Also provided as an input to the alert prioritization computer 40 is the output from an Air Data and Navigation Systems 42. The Air Data and Navigation Systems 42 produce data related to the position, speed and acceleration of the aircraft.

The hazard prioritization computer 40 combines the information in the manner described hereinbelow with respect to FIGS. 2 through 6 to determine which of the conditions, if any, from the various warning systems 21–26 warrants the attention of the flight crew. The hazard prioritization computer 40 then provides pertinent alerting information to a display computer 50 which, in turn, drives the aircraft's audio system 52, to thereby provide audible alerts. In addition, the alert prioritization computer 40 provides alerting information to the display computer 60 which in turn produces flight crew alerts on the aircraft's visual displays 62.

In addition, the hazard prioritization computer 40 can also alert the aircraft's autoflight systems 70 in cases in which immediate or automatic aircraft response is required.

Figure 2:
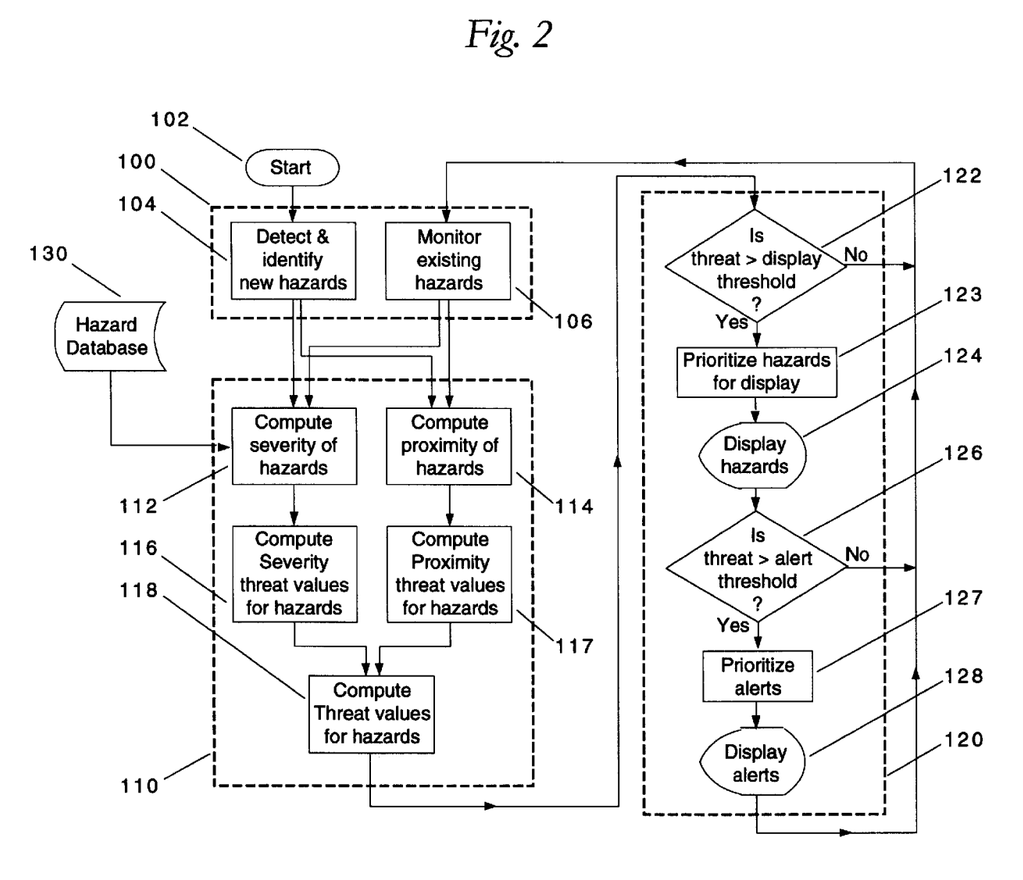
FIG. 2 is a logic flow diagram which illustrates the logical steps performed by the preferred embodiment of the dynamic multi-attribute hazard prioritization system.

FIG. 2 is a logic flow diagram illustrating the sequence of logical steps performed by the hazard prioritization computer 40 of FIG. 1.

The hazard prioritization system comprises three functional modules, including a hazard detection, identification and monitoring module 100, a threat assessment module 110 and a display and alert prioritization logic module 120. The logic system starts at start block 102. It then enters module 100, and, at block 104 detects and identifies new hazards. In block 104, the system analyzes the information provided by the warning systems 21–26 to identify the presence of a new aircraft hazard. The output from block 104 is passed both to a block 112 which computes the severity of hazards and a block 114 for computing the proximity of hazards. That is, there are two main attributes of a hazard which must be considered in assessing the level of threat the hazard poses to the aircraft. First, the proximity of the hazard to the aircraft (closer hazards should be given higher threat values and therefore higher alerting priorities and here it is convenient to use a time-based measure of proximity, since many aircraft and flight crew responses have reaction times associated therewith. In addition, a distance-based measure of proximity is inappropriate for moving hazards such as traffic since they may be moving away, in which case their current distance is not a meaningful measure of the threat they pose).

The second attribute of the hazard is the potential severity of the hazard (more severe hazards should be given higher threat values and therefore higher alerting priorities).

Also provided out of the hazard detection, identification and monitoring module 100 is the output from a monitor existing hazards block 106. The monitor existing hazards block 106 provides attributes of existing hazards to the compute severity of hazards block 112 and the compute proximity of hazards block 114.

An additional input to the compute severity of hazard block 112 is the output from a hazard database 130. The hazard database contains computed hazard severity levels for the various possible aircraft hazards. Each newly detected or previously detected hazard must be assigned a raw severity, s. The severity can be thought of as a probability, p, that an encounter with such a hazard will result in an accident:

$$s = p \quad \text{[Equation 1]}$$

For example, an encounter with terrain is almost certain to result in an accident (s=p=1), while an encounter with wake turbulence is less likely to result in such an accident (say p=0.1). The severities of a wide range of hazards can be determined in this manner when the alerting system is being designed, and can be stored in the hazard database 130 provided in the alert prioritization computer (40 of FIG. 1).

An alternate variation for assigning severities is that where it is possible to assess the cost (say an injury or loss of life) associated with an accident, that can be accounted for in the severity, the severity can then be thought of as the expected damage resulting from the encounter with the hazard:

$$s = E\{d\} = p \cdot d$$

where p is again the historical probability that an encounter with a hazard of similar nature and size will lead to an accident, and d is the fractional amount of damage typically associated with such an accident. For example, an encounter with terrain is almost certain to result in an accident (p=1)

with severe damage (d=1), while an encounter with wake turbulence is less likely to result in an accident (say p=0.1), and if it were to lead to an accident, that accident would involve less damage (say d=0.15).

Alternatively, the database of hazard severities can be constructed by surveying experts from the aviation community, such as pilots, engineers and so forth, during the system design. These experts would provide the range of severity for each type of hazard.

Figure 3:
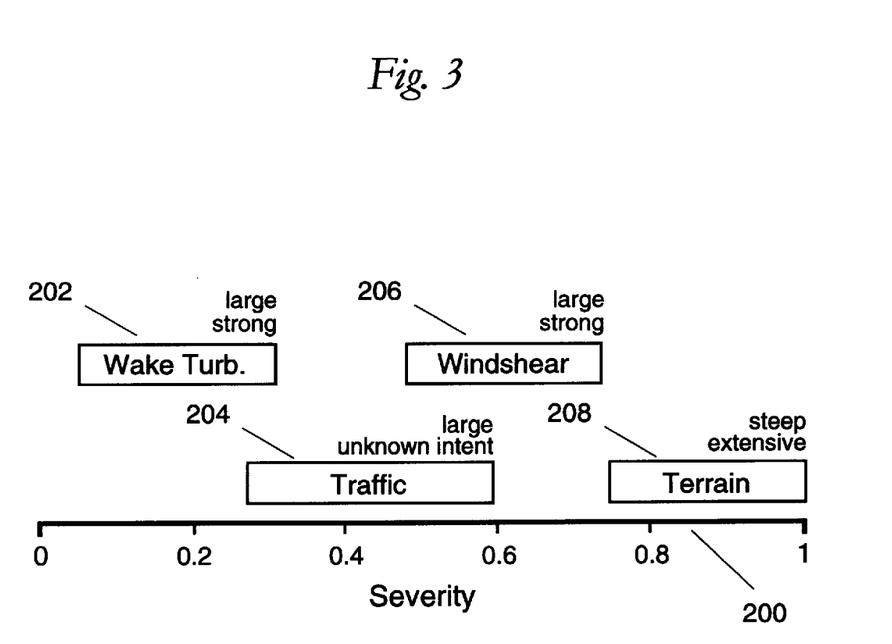
FIG. 3 depicts ranges of severity, s, for several typical aircraft hazards.

FIG. 3 depicts ranges of severity, s, determined in the aforementioned manner for several typical aircraft hazards. The severity of each detected hazard is adjusted within each range according to such qualities as size, strength, intent, and steepness. Along the horizontal axis 200 is a scale listing severities from 0 to 1. Depicted on the scale are possible ranges for wake turbulence 202, traffic 204, windshear 206 and terrain 208. Within the range shown, the value of severity for the windshear hazard 206 is dependent on its extent, with larger areas of windshear involving more severe hazards, its strength, with stronger shears representing more severe hazards, and its type, with shears having large up and down drafts being related to more severe hazards.

Similarly, the severity of the threat posed by traffic is influenced by the attributes of size, with larger aircraft being more severe hazards, and with an aircraft of unknown intent being a more severe hazard. The severity of the threat posed by wake turbulence 202 is influenced by the attributes of extent, with larger areas of turbulence being more severe hazards, and strength, with stronger areas of turbulences being more severe hazards. Every other type of hazard may be assigned a similar range of severities, and a similar set of attributes which influence its severity value within that range.

Returning to FIG. 2, the output from compute severity of hazards block 112 passes to a compute severity threat values for hazards block 116. In block 116, the raw severity, s, is then converted into a severity component of the threat function, S. This can be achieved simply by multiplying by unity, so that S=s. However, for the present example, less severe threats are accentuated, in order to make sure they receive adequate attention, by using the following exponential transformation:

$$S = k \cdot (1 - e^{-s/s_0}) \quad \text{[Equation 2]}$$

where k is chosen so that S lies between 0 and 1:

$$k = 1/(1 - e^{-1/s_0}) \quad \text{[Equation 3]}$$

and where $s_0$ is a positive constant which is chosen to control the shape of the exponential function of Equation 2.

Figure 4A:
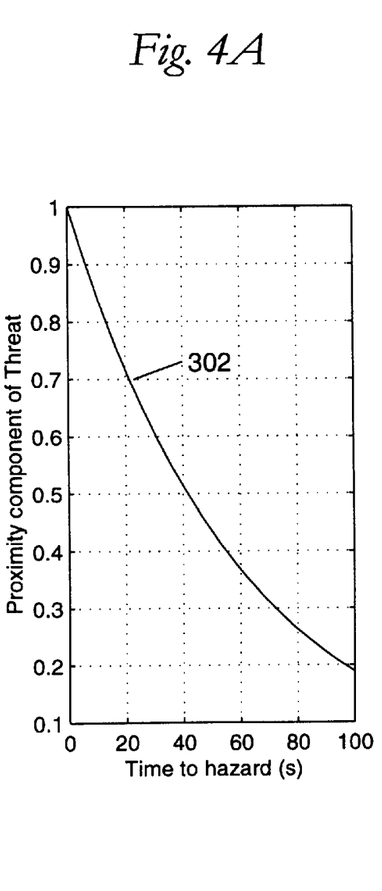
FIGS. 4A, 4B illustrate the components of a proposed threat function, with 4A depicting a graph of threat as a function of time-to-hazard and 4B depicting a graph of threat as a function of hazard severity.
Figure 4B:
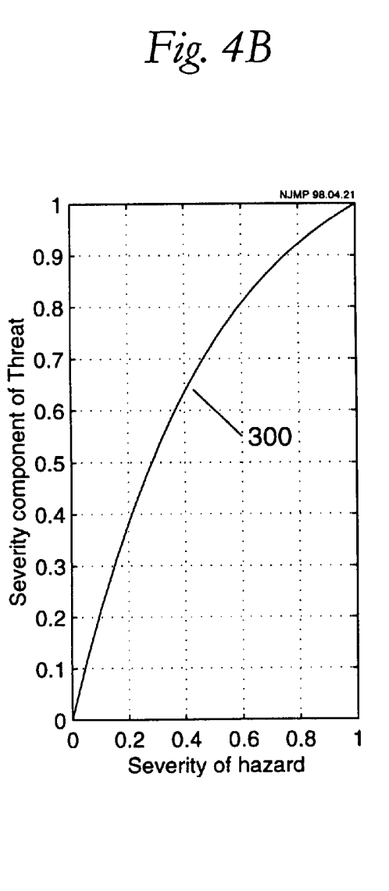

The severity function of Equation 2 is set forth in FIG. 4B. Here, plotted on the horizontal axis is the severity of hazard from 0 to 1 and on the vertical axis is the severity component of the threat also measured from 0 to 1. Shown is a graph 300 of the severity component of the threat function S, as set forth in Equation 2, with $s_0$ set to 0.5.

Returning to FIG. 2, out of the compute proximity of hazards block 114, the system enters the compute proximity threat values for hazards block 117. Depicted in FIG. 4A is the exponential function which is selected to model the variation of the proximity component P, of the threat value with time-to-hazard, $\tau$:

$$P = e^{-\tau/\tau_0} \quad \text{[Equation 4]}$$

where the parameter $\tau_0$ is, in this example, set at 60 seconds by design.

In a variation of the above method for hazards which require a response with a significant lead time, this lead time might be subtracted from the time-to-hazard to produce a "time-to-point-of-no-return". The proximity component of threat, P, is then calculated according to Equation 4 in the normal way. Shown in FIG. 4A on the horizontal axis is time-to-hazard (s) from 0 to 100 seconds. Shown on the vertical axis is the proximity component of threat from 0 to 1. The graph 302 depicts the proximity component of threat, P, as set forth in accordance with Equation 4.

Now, again returning to FIG. 2, out of the compute severity threat values for hazards block 116 and the compute proximity threat values for hazards block 117, the system enters the compute threat value for hazards block 118. Once the two components of the threat (severity and proximity) have been calculated, they must be combined into a single threat value. In this, the preferred embodiment of the invention, the threat value T, is simply the product of those components:

$$T = P \cdot S = (e^{-\tau/\tau_0}) \cdot k \cdot (1 - e^{-s/s_0}) \quad \text{[Equation 5]}$$

Figure 5:
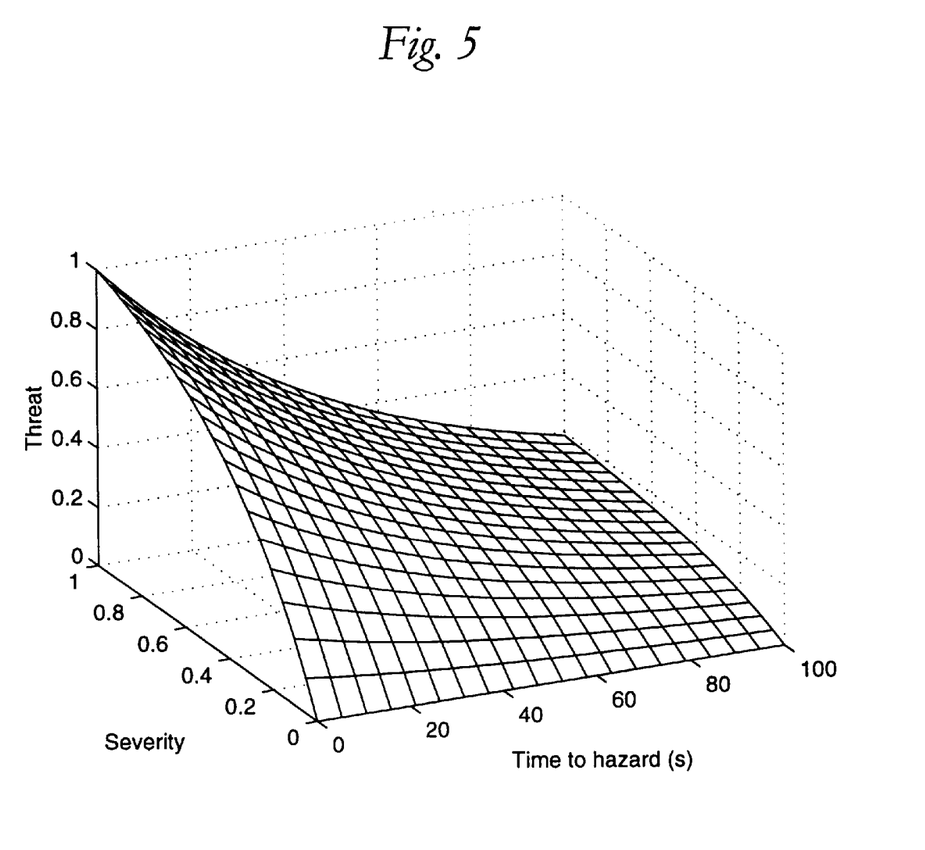
FIG. 5 is a graphical representation of an exemplary threat function of temporal proximity and hazard severity.

FIG. 5 is a graphical representation of the exemplary threat function T of temporal proximity and hazard severity. FIG. 5 plots threat, ranging from 0 to 1 versus severity, ranging from 0 to 1, and time to hazard, ranging from 0 to 100 seconds. There are several salient features of this threat function T: (1) at every non-zero level of hazard severity, the threat rises as the hazard gets closer, (2) at every value of time-to-hazard, the threat increases with the severity of the hazard, and (3) the threat value is bounded between 0 and 1 by design.

Figure 6:
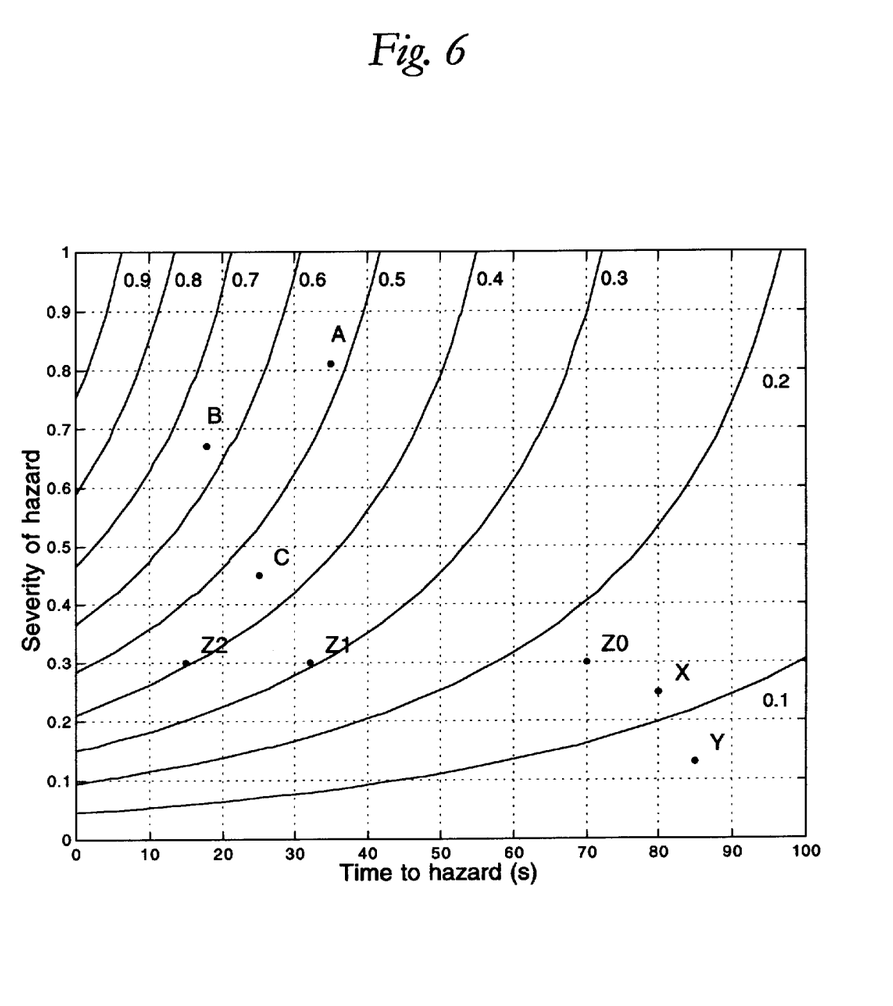
FIG. 6 is a contour plot of the same exemplary threat function, illustrating contours of constant threat or "iso-threat" lines.

Returning again to FIG. 2, out of the compute threat value for hazards block 118, the system enters the display and alert prioritization logic module 120. Here, the system determines at block 122 whether the threat value is greater than a predetermined display threshold. If it is not, the system returns to block 106 in module 100 and monitors existing hazards. If the threat value does exceed the display threshold, the system resolves any display conflicts at block 123, and progresses to display the hazard at block 124. Then, at block 126, the system determines whether the threat exceeds the alert threshold, if it does not, the system again reverts to monitor the existing hazards at block 106. However, if the threat level does exceed the alert threshold, the system resolves any alert conflicts at block 127, and increments to display the alert at block 128. The method of prioritizing conflicts performed in blocks 123 and 127 is depicted in FIG. 6 which is a contour plot of the threat function set forth in Equation 5 and also shown in FIG. 5. Plotted on the horizontal scale is time-to-hazard, in seconds, and on the vertical scale is severity, measured from 0 to 1. The various lines depicted in FIG. 6 are contours of constant threat, or so-called "iso-threat" lines. Each iso-threat line is labeled with its threat value. Depicted on FIG. 6 are three exemplary hazards: A, B and C. If the warning systems which monitor these three hazards detect no changes in their severities, then the points will move to the left as the aircraft approaches the hazards.

This threat-value approach to hazard prioritization can be used for four purposes:

(1) to decide when to display potential hazards, (2) to decide how to resolve conflicts between displayed hazards, (3) to decide when to generate an alert for each hazard, and (4) to decide how to resolve conflicts between hazard alerts.

Display De-cluttering

Multifunction displays currently make use of arbitrary criteria to decide when to display certain kinds of external features of the environment before they become dangerous. By using the hazard prioritization system described herein, the threat value for each potential hazard can be used in place of such arbitrary criteria. The display designer need only pick a level of threat value, $T_d$, below which a potential hazard will not be automatically displayed to the flight crew. However, such a scheme should not prevent the flight crew from choosing to display information about a potential hazard in spite of its low threat value.

For example, assume $T_d=0.1$. Now consider the two hazards X and Y in FIG. 6. Hazard Y, which is below the threshold, would not be displayed to the flight crew, while hazard X, which is above the threshold, would be displayed.

Display Prioritization

When two or more hazards have threat values which are above the display threshold, both should be displayed to the flight crew. However, the displays for many hazards are mutually exclusive (for example weather radar outputs and terrain cannot be displayed simultaneously on most aircraft). In such cases, current display systems use arbitrary criteria to decide which to display to the flight crew. By using the hazard prioritization system described herein, the threat value for each potential hazard can be used in place of such arbitrary criteria. Where there is a display conflict, the display system automatically chooses to display the hazard with the higher threat value.

Alert Generation

The generation of alerts follows a similar procedure to the aforementioned display de-cluttering procedure. Assume that the designer wishes to present two levels of alert to the flight crew: cautions for the less threatening hazards, and warnings for the more threatening hazards. The designer selects two alerting thresholds, $T_w$ and $T_c$, where $T_w>T_c>T_d$ for warnings and cautions, respectively. As hazards move closer to the aircraft, or as their assessed severities increase, their threat values will increase. When the threat value for a particular hazard rises above $T_c$, a caution-level alert is generated for that hazard.

If a hazard's threat value rises above $T_w$, a warning-level alert is generated. In addition, the auto-flight system can be instructed to take immediate avoidance action in cases where there may be not enough time for human intervention or response.

For example, assume $T_c=0.2$ for cautions, and $T_w$ equals 0.4 for warnings. The hazard Z is shown in FIG. 6 at three stages of its progression towards the aircraft: Z0, Z1, and Z2. Because its threat value is greater than 0.1, the hazard would already be displayed to the flight crew at 70 seconds from the vehicle (Z0 in FIG. 6). At 32 seconds time-to-hazard (Z1), it would just have generated a caution-level alert and at 15 seconds time-to-hazard (Z2) it would just have generated a warning-level alert.

Alert Prioritization

When two or more alerts require the same area of a visual display or require simultaneous broadcast of an audible alert, some means must be used to prioritize them (i.e., to decide which alert must be provided first). The threat function described above easily accomplishes this task in the same manner used to accomplish display prioritization. Using this method, prioritization may be achieved by simply comparing the threat values for each of the alerts in question and presenting the alert for the hazard with the highest threat value.

For example, consider the three hazards shown as dots in FIG. 6, A, B and C. If they were ranked by temporal proximity, the prioritization order would be B-C-A In other words, if hazards A and C were generating simultaneous conflicting alerts, a proximity-based system would display only the alert for hazard C—an unsatisfactory condition given the relative severities of A and C. Alternatively, if the hazards were ranked by their severity, a severity-based prioritization system would rank them A-B-C (this would allow hazard A to out-prioritize hazard B, which would be unsatisfactory given their relative proximities). However, using the threat-value based prioritization system with the exemplary threat function of Equation 5 and FIG. 6, the resulting prioritization is B-A-C. This ordering is the most logical, given the severities and proximities of the three hazards.

In summary, an aircraft dynamic, multi-attribute hazard prioritization system has been described in detail. Many modifications and variations thereto are possible, all of which are included within the scope of the invention.

For example, in an alternate embodiment of the invention, each individual warning system (e.g., the terrain warning system) could do the time-to-hazard and severity calculations for things it detects, and combine the numbers to produce a threat value, and then communicate the threat value to the prioritization computer, or even straight to the displays.

What is claimed is:

1. An aircraft dynamic, multi-attribute hazard prioritization system comprising:

at least two aircraft warning systems, each system operable to produce a hazard signal having associated therewith at least two hazard attributes including a time to hazard related signal, $\tau$;

said system further comprises a hazard database for storing a severity signal,s, for each of said at least two aircraft warning systems;

processing means for processing said hazard signals through a predetermined threat function, said processing means combining real-time measurements of said hazard attributes including time to hazard related signals, $\tau$, contained in each of said hazard signals and the retrieved severity signals, s, to continuously assess the real-time threat values for hazards identified and thus to assign threat priorities to the hazards identified by each of said at least two aircraft warning systems, and aircraft display and alerting systems, responsive to the threat priorities of the signals from each of said at least two aircraft warning systems, to predeterminedly activate aircraft displays and alerts.

2. The system of either one of claim 1 wherein said aircraft display and alerting systems include means for activating aircraft displays and alerts such that the hazard having the higher assigned threat priority is given display and alert priority.

3. An aircraft dynamic, multi-attribute hazard prioritization system comprising:

a first aircraft warning system, said first aircraft warning system monitoring a first predetermined aircraft condition and producing a first signal representing a first time to hazard, $\tau_1$, in response thereto;

a second aircraft warning system, said second aircraft warning system monitoring a second predetermined aircraft condition and producing a second signal representing a second time to hazard, $\tau_2$, in response thereto;

logic control means including:

a) a hazard database for storing predetermined severity signals $s_1$, $s_2$, for said first and second aircraft warning systems, respectively, and b) processing means for processing said first and second signals representing times to hazards $\tau_1$, and $\tau_2$ with the retrieved predetermined severity signals $s_1$ and $s_2$ through a predetermined prioritization function and generating a threat priority value for each of said first and second alert signals; and display and alerting systems for providing flight crew displays and alerts of said first and second alert signals as a function of the threat values thereof.

4. In an aircraft hazard alerting system, a method for realizing a dynamic, multi-attribute hazard prioritization, the method comprising the steps of:

providing at least two aircraft warning systems, each system operating to produce a hazard signal having associated therewith at least two hazard attributes;

processing said hazard signals through a predetermined prioritization function combining the real-time values of the hazard attributes associated with the signals from each of said at least two aircraft warning systems to continuously determine a dynamic threat value for each hazard; and implementing aircraft displays and alerts in response to the determined threat values of said hazard or hazards detected by said at least two aircraft warning systems.

5. The method of claim 4 including the further steps of:

providing each of said at least two aircraft warning systems with means for producing a time to hazard related signal, $\tau$;

providing a hazard database for storing a severity signal, s, for each of said at least two aircraft warning systems; and implementing said processing means to process the time to hazard related signal, $\tau$, and the retrieved severity signal, s, through a threat function $T(\tau, s)$, and determining said threat value for the hazard signal from each of said at least two aircraft warning systems.

6. The method of either one of claims 4 or 5 wherein the step of implementing aircraft displays and alerts includes activating aircraft displays and alerts such that the hazard having the higher assigned threat value is given display and alert priority.

7. A method for implementing an aircraft dynamic, multi-attribute hazard prioritization system, comprising the steps of:

implementing a first aircraft warning system, with said first aircraft warning system monitoring a first predetermined environmental condition and producing a first signal representing a first time to hazard, $\tau_1$, in response thereto;

implementing a second aircraft warning system, said second aircraft warning system monitoring a second predetermined environmental condition and producing a second signal representing a second time to hazard, $\tau_2$, in response thereto;

providing logic control means for performing the steps of:
a) providing a hazard database for storing predetermined severity signals $s_1$, $s_2$, for said first and second aircraft warning systems, respectively, and
b) processing said first and second signals representing times to hazards $\tau_1$, and $\tau_2$ with the retrieved predetermined severity signals $s_1$, and $s_2$ through a predetermined threat function and generating a threat value for each of said first and second signals; and displaying and alerting to the flight crew alerts of the first and second hazards as a function of the threat value thereof.

8. The method of claim 7 wherein the step of displaying and alerting includes producing flight crew displays and alerts such that the hazard having the higher threat value is given display and alert priority.

9. The method of claim 7 including the further step of subtracting from selected time to hazard signals, signals representative of a predetermined hazard response lead time to thereby produce a time-to-point-of-no-return alert signal.

* * * * *